(12) United States Patent
Comito (10) Patent No.: US 8,768,859 B2
(45) Date of Patent: Jul. 1, 2014

(54) SYSTEM AND METHOD OF RATING A PRODUCT

(71) Applicant: Anthony R. Comito, Manchester, NH (US)

(72) Inventor: Anthony R. Comito, Manchester, NH (US)

(*) Notice: Subject to any disclaimer, the term of this patent is extended or adjusted under 35 U.S.C. 154(b) by 0 days.

(21) Appl. No.: 13/921,620

(22) Filed: Jun. 19, 2013

(65) Prior Publication Data

US 2014/0040160 A1 Feb. 6, 2014

Related U.S. Application Data

(60) Provisional application No. 61/677,948, filed on Jul. 31, 2012.

(51) Int. Cl.
*G06Q 30/00* (2012.01)

(52) U.S. Cl.
USPC .......................................................... 705/347

(58) Field of Classification Search
USPC .................... 705/7.29, 7.31–7.39, 35, 347
See application file for complete search history.

(56) References Cited

U.S. PATENT DOCUMENTS

| | | | |
|---|---|---|---|
| 6,430,554 B1 | 8/2002 | Rothschild | |
| 7,440,901 B1 * | 10/2008 | Dlott et al. | .................... 705/346 |
| 7,974,881 B2 | 7/2011 | Culver et al. | |
| 2003/0069822 A1 | 4/2003 | Ito | |
| 2003/0115133 A1 | 6/2003 | Bian | |
| 2004/0133501 A1 | 7/2004 | Parry et al. | |
| 2004/0193535 A1 | 9/2004 | Barazesh | |
| 2004/0249697 A1 | 12/2004 | Ohnemus et al. | |
| 2005/0119946 A1 | 6/2005 | Cakiral | |
| 2005/0137899 A1 | 6/2005 | Davies et al. | |
| 2007/0088746 A1 | 4/2007 | Baker | |
| 2008/0033939 A1 | 2/2008 | Khandelwal | |
| 2008/0091705 A1 | 4/2008 | McBride et al. | |
| 2008/0228614 A1 | 9/2008 | Ben-Zvi et al. | |
| 2010/0017265 A1 | 1/2010 | Weingarten et al. | |

(Continued)

FOREIGN PATENT DOCUMENTS

| | | |
|---|---|---|
| EP | 1059599 A2 | 12/2000 |
| JP | 2002-108919 A | 1/2012 |

OTHER PUBLICATIONS

Michal Strahilevitz, "The Effects of Product Type and Donation Magnitude on Willingness to Pay More for a Charity-Linked Brand", Journal of Consumer Psychology, 8(3), pp. 215-241; downloaded from:http://www.people.fas.harvard.edu/~hiscox/Strahilevitz.pdf.*

(Continued)

*Primary Examiner* — Candice D Wilson
*Assistant Examiner* — Ehrin Pratt
(74) *Attorney, Agent, or Firm* — Mesmer & Deleault, PLLC (57) ABSTRACT

For a system having a network-enabled device in communication with a computing network, a method of rating a product includes receiving a product identifier of a product from the network-enabled device, determining a product price, determining a brand entity, and defining a geographic perimeter of interest. One or more brand entity economic values attributed to the product are determined, such as a revenue received amount, a wages paid amount, a taxes paid amount, and/or a charitable contribution amount. Economic impact values are determined for the product and relate the product price to the brand entity economic value for the perimeter of interest. The method determines and outputs an economic impact rating to a user of the network-enabled device based the one or more economic impact values.

20 Claims, 3 Drawing Sheets

(56) References Cited

U.S. PATENT DOCUMENTS

| | | |
|---|---|---|
| 2010/0082447 A1 | 4/2010 | Lin |
| 2010/0250462 A1 | 9/2010 | Wheeler et al. |
| 2012/0016764 A1 | 1/2012 | Ouimet |
| 2012/0246092 A1 | 9/2012 | Stibel et al. |
| 2012/0310682 A1 | 12/2012 | Carter |

OTHER PUBLICATIONS

Korean Intellectual Property Office, International Search Report, PCT/US2013/046539 (Sep. 27, 2013).

Korean Intellectual Property Office, Written Opinion of the International Searching Authority, PCT/US2013/046539 (Sep. 27, 2013).

* cited by examiner

SYSTEM AND METHOD OF RATING A PRODUCT

This application claims the benefit of U.S. provisional patent application Ser. No. 61/677,948, filed on Jul. 31, 2012 and titled "A System and method For Recommending Products on Economic Grounds at the Retail and B2B Point of Decision is Disclosed."

BACKGROUND OF THE INVENTION

1. Field of the Invention

The present invention relates generally to computer-implemented methods and more particularly to a system and method of rating a product or service.

2. Description of the Prior Art

Consumers often must decide whether to buy a product based on many factors that include product features, price, or performance of the product. Consumers also consider whether a product is consistent with one's moral, environmental, and personal values. In many cases, a retail consumer decides whether to purchase a product while viewing one's choices at the point of purchase in a retail store. Similarly, a business must also decide among various products when purchasing supplies, services, inventory, and equipment.

In addition, consumers and business may also consider whether to purchase a product based on the product's country of origin. For example, in the interest of supporting the US economy, a consumer may prefer to purchase products that are made in the US over products made in other countries. Also, market research has shown that consumers automatically form an opinion or stereotype about a product based on its country of origin. Consumer opinions are particularly relevant when a product is produced in a country perceived as producing lower-quality goods or having oppressive labor practices. Not surprisingly, consumers have become increasingly aware of product origins.

Traditionally, the United States Federal Trade Commission has required that products with the label "Made in the USA" must be "all or virtually all" made in the U.S., meaning that such a product should contain no more than negligible amounts of foreign content. Also, most imports to the US, including many food items, must bear labels informing the ultimate purchaser of the product's country of origin.

To help with product purchase decisions, several systems and methods exist to aid the consumer or business in deciding which product to purchase. U.S. Pat. No. 6,430,554 to Rothschild discloses an interactive search system used on a computer network for supplying product information to the user based on an identifying product code such as a barcode or UPC code input to the system. Using a bar code or UPC code, a computer network identifies the product's manufacturer and obtains information such as price comparisons, locations where the product is available for purchase, recall notices related to the product, news articles, websites, discussion groups, and product reviews. The method also facilitates ordering the product by directing the consumer to a web page where the product is available for purchase.

U.S. Pat. No. 7,917,401 to Baker discloses a method and system that uses a barcode or RFID reader on a handheld device for obtaining health and financial information about products. Based on a code scanned by the user, the system identifies the product and obtains price and health information about the product. The system analyzes whether the price is consistent with the user's financial plan and also obtains competitor's prices, quality ratings, and consumer reviews. The system also provides health-related information to the user, such as ingredient alerts, fat and protein content, caloric content, and health budget analyses.

Electronic methods are also available for evaluating the sustainability of a business entity. U.S. Pat. No. 7,277,864 to Ohnemus discloses a method of rating the sustainability of a legal entity based on an analysis of at least some non-economic factors. A company may enter information about itself and data is used to compute one or more sustainability scores for environmental impact, treatment of people, governance, financial criteria, and economic criteria. Scores are used to rate companies, products, governments, and executives with respect to one another or within an industry. A subscriber to the method may customize how scores are computed in order to reflect institutional preferences.

In combination with these methods described above, the consumer may look at product packaging to determine the product's country of origin.

SUMMARY OF THE INVENTION

Despite the information available to consumers and businesses using the above-described methods, these methods and product labeling leave much information untold about the product, the manufacturer, and how the consumer's purchase of that product will financially or otherwise impact a city, state, region, or country. With no relevant information available on the product packaging, consumers would need to research which brands and products are consistent with personal values and to make a product purchase decision. Considering the combination of poor economic conditions since late 2008, encouragement from consumer groups to buy USA-made products, and a dearth of information about the recipients of purchase price money, consumers greatly desire to know more about the products they purchase and the economic impact information for a given product. Accordingly, a need exists for a system and method of rating or scoring a product according to the product's economic impact to a selected geographic region or perimeter of interest.

It is an object of the present invention to provide a method of rating products or services according to the product's impact on a specified geographic region.

It is another object of the present invention to provide an economic impact score for a product based on a product identifier input to computing device.

The present invention achieves these and other objectives by providing a system and method to evaluate the economic impact of a product for a selected geographic perimeter of interest.

In one embodiment, a method of rating a product using a system having a network-enabled device disposed in communication with a computing network includes receiving a product identifier of a product from a network-enabled device disposed at a first location and in communication with a computing network at a second location. A product price of the product and a brand entity of the product are determined based on the product identifier. A geographic perimeter of interest is defined based on input received from the network-enabled device. In one embodiment, the input received is input entered by the user or the location of the network-enabled device. The computer network determines one or more brand entity economic values attributed to the product, where the brand entity economic values include a revenue amount received by the brand entity, a wages amount paid by the brand entity, a taxes amount paid by the brand entity, and a charitable contribution amount made by the brand entity. An economic impact value is calculated for each brand entity economic value, where the economic impact value relates the product price to the brand entity economic value for the geographic perimeter of interest. An economic impact rating is determined for the product based on the economic impact values and communicated to the user of the network-enabled device.

In one embodiment, the method includes communicating the economic impact values to the user of the network-enabled device. The economic impact values may be expressed as a percentage of the product price.

In another embodiment, the method includes determining an industry classification for the product based on the product identity, where the economic impact rating has a scale based on the industry classification. In another embodiment, the method includes determining a comparable product based on the industry classification of the product, where the industry classification includes a general class of goods or services and at least one sub classification. An additional economic impact rating is determined for the comparable product communicated to the user of the network-enabled device.

In another embodiment, the method includes determining one or more economic impact values that relates one of the brand entity economic values to an extra-perimeter region outside the geographic perimeter of interest.

In another embodiment, determining the economic impact rating for the product includes calculating a weighted sum of the economic impact values. In one embodiment, the weighted sum is weighted based on an user input received by the network-enabled device.

In another embodiment, the method includes the steps of determining at least one supply chain entity of the product, determining at least one supply chain entity economic value attributable to the product for the at least one supply chain entity. The supply chain entity economic values include a revenue received amount, a wages paid amount, a taxes paid amount, and a charitable contribution amount.

In another embodiment, the method includes the step of determining an economic impact rating for the product includes determining an adjustment value that relates the product price to a price of a comparable product.

In another embodiment, the method includes the step of defining at least one additional perimeter of interest.

In another embodiment, the method includes the steps of determining at least one economic impact values that relates the product price to the brand entity economic value for each additional perimeter of interest and determining an economic impact rating for the product for each additional perimeter of interest. In one embodiment, the economic impact rating is based on the economic impact value(s) for the geographic perimeter of interest and for the additional perimeter(s) of interest.

In one embodiment, the step of communicating the economic impact rating for the product includes communicating at least one additional economic impact rating for the product, where the additional economic impact rating(s) is (are) for a region outside of the geographic perimeter of interest. In one embodiment, communicating the economic impact rating and communicating the at least one additional economic impact rating of the product includes displaying a map including the geographic perimeter of interest and the region outside of the geographic perimeter of interest with the respective economic impact ratings.

Also disclosed is a system used to rate a product, where the system includes a computing network having a central processing unit, a network interface, a mass-storage device coupled to the central processing unit, and at least one database coupled to the central processing unit. A network-enabled device is disposed in communication with the computing network via the network interface and configured for inputting a product identifier of a product, communicating the product identifier to the central processing unit, and communicating an economic impact rating for the product to an user of the network-enabled device. The system is configured for determining a product price of the product and brand entity of the product based on the product identifier. The system also is configured to determine one or more brand entity economic values attributed to the product, such as a revenue amount received by the brand entity, a wages amount paid by the brand entity, a taxes amount paid by the brand entity, and a charitable contribution amount made by the brand entity. The system is further configured to calculate an economic impact value for each brand entity economic value, where the economic impact value relates the product price to the brand entity economic value for the geographic perimeter of interest. The system then determines an economic impact rating for the product based on the economic impact values.

In another embodiment, the system is configured to determine a comparable product based on the product identifier, determining an economic impact rating for the comparable product, and communicate the economic impact rating for the comparable product to the user of the network-enabled device.

In another embodiment, the system is further configured to define the perimeter of interest based on user input received by the network-enabled device.

DETAILED DESCRIPTION OF THE PREFERRED EMBODIMENT

Figure 1:
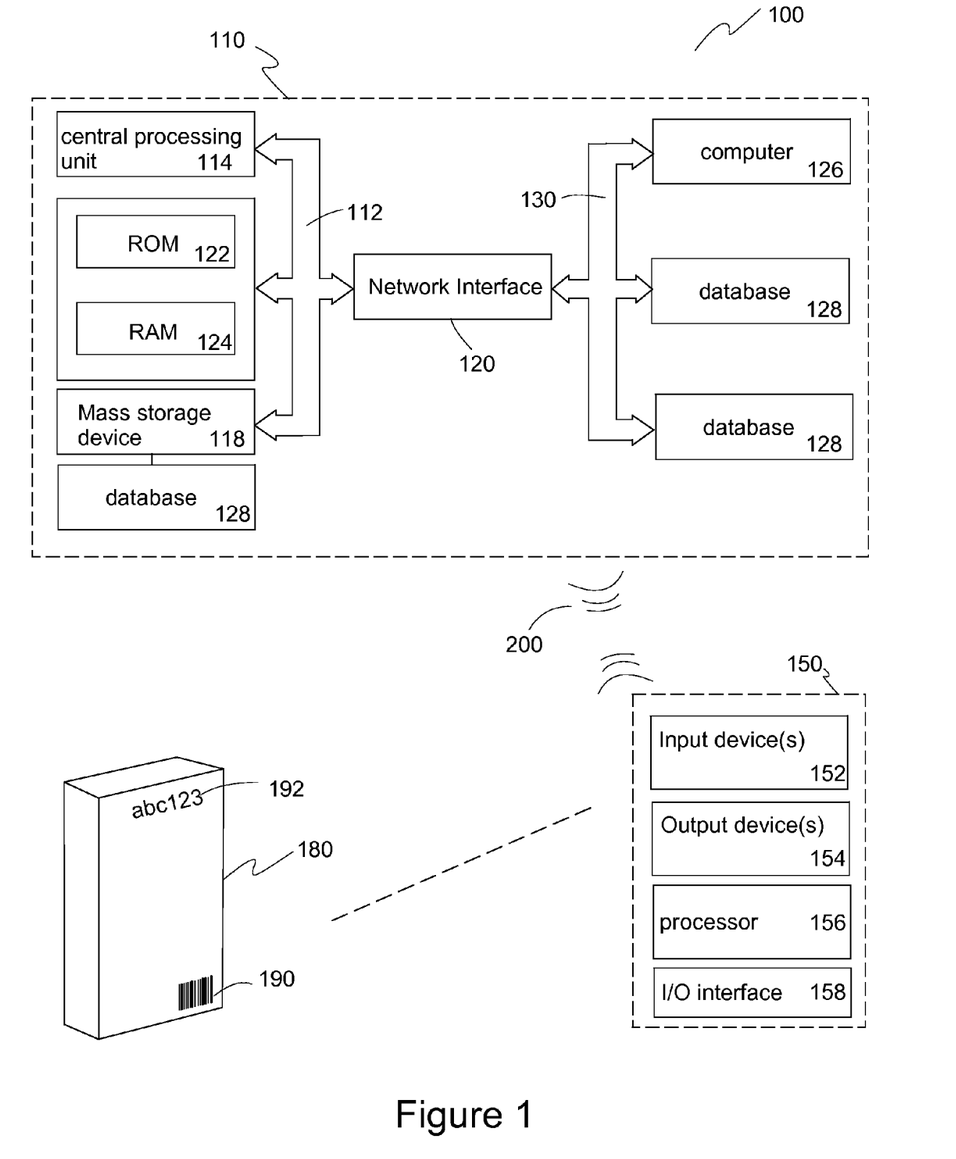
FIG. 1 is a diagram of one embodiment of a system of the present invention showing a network-enabled device, a computing network, and a product.
Figure 2:
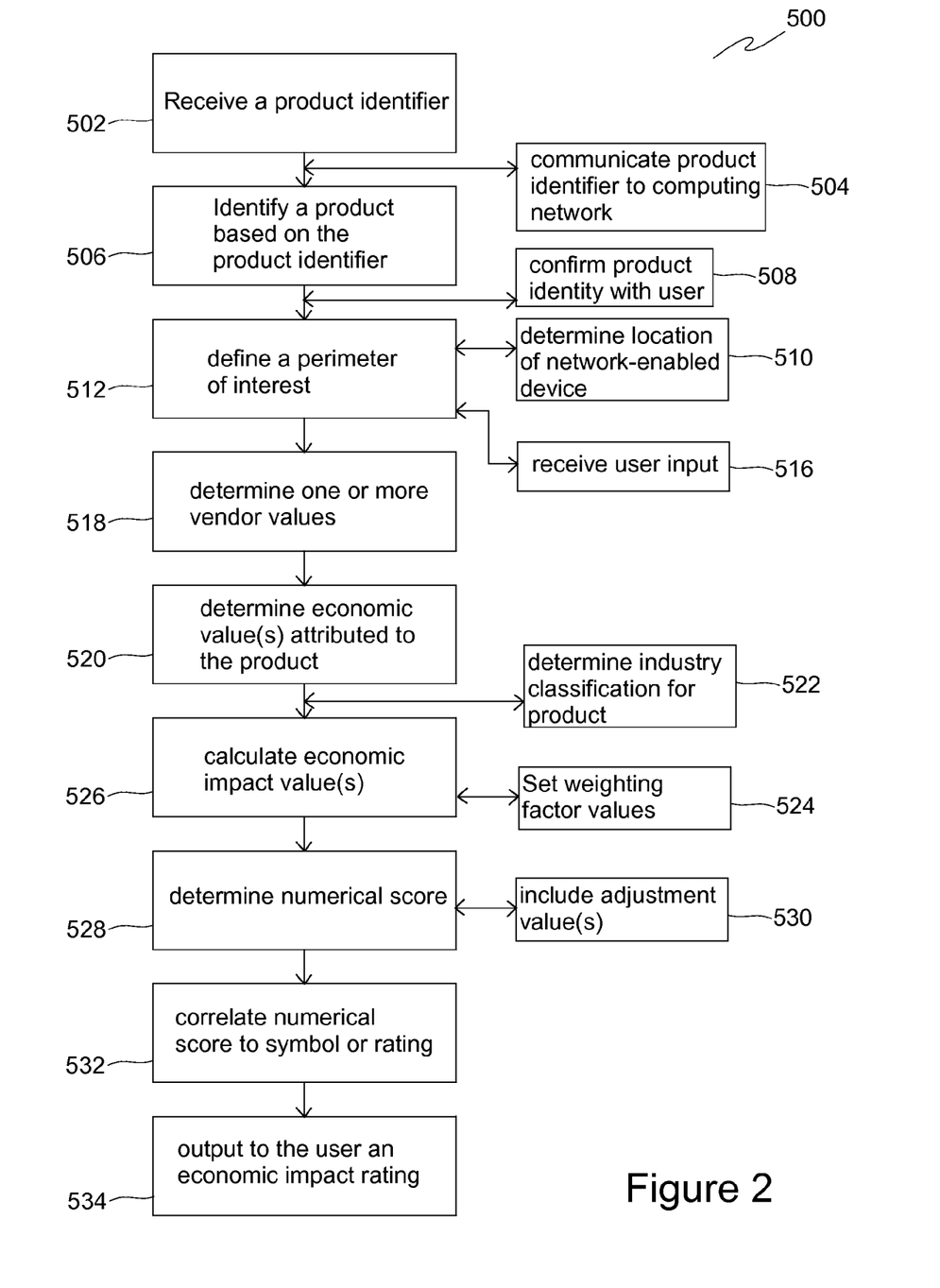
FIG. 2 is a flow chart illustrating steps performed in one embodiment of a method of rating a product or service.
Figure 3:
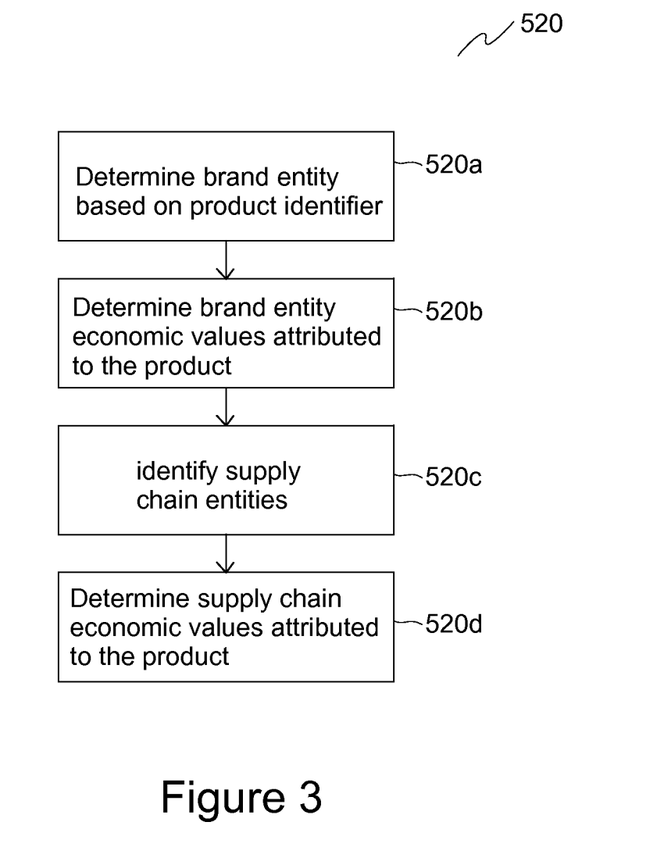
FIG. 3 is a flow chart illustrating steps included in one embodiment of step 520 shown in FIG. 2.

The preferred embodiment of the present invention is illustrated in FIGS. 1-3. FIG. 1 shows one embodiment of a system 100 configured for rating a product 180. System 100 includes a computing network 110 in communication with a network-enabled device 150 with a wired or wireless connection 200. System 100 is useful, for example, to obtain, score, and display an economic impact rating for product 180, such as performed in embodiments of a method 500 of scoring product 180 discussed below with reference to FIGS. 2 and 3.

Embodiments of the present invention embrace one or more computer readable media, where each medium includes or may be configured to include data or computer-executable instructions for manipulating data. The computer-executable instructions include data structures, objects, programs, routines, or other program modules that may be accessed by a processing system, such as one associated with a general-purpose computer capable of performing various different functions or one associated with a special-purpose computer capable of performing a limited number of functions.

Computer-executable instructions cause computing network 110 to perform a particular function or group of functions and are examples of program code for implementing steps of methods of the present invention. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disc read-only memory ("CD-ROM"), or any other device component that is capable of processing data or executable instructions that may be accessed by a processing system.

System

With reference to FIG. 1, one embodiment of a system 100 for implementing the invention includes computing network 110 disposed in communication with network-enabled device 150. Connection 200 can be wired or wireless and made using a local area network, wide area network, or the Internet. Computing network 110 may be, for example, a stand-alone general purpose or special-purpose computer, a network computer, or a plurality of hardware and software components connected to a network and configured to operate in communication with one another.

In one embodiment, computing network 110 includes a system bus 112 of any architecture and configured to connect various components in communication and enable data to be exchanged between the components. Typical components connected to system bus 112 include a processing system or central processing unit 114, memory 116, and mass storage devices 118, and one or more network interfaces 120, each of which will be discussed below. Central processing unit 114 includes one or more processors, such as a central processor, and optionally one or more other processors designed to perform a particular function or task. Central processing unit 114 typically executes instructions provided on computer readable media, such as in memory 116 or in a mass storage device 118.

Memory 116 includes one or more computer readable media that includes or may be configured to include data or instructions for manipulating data, and may be accessed by central processing unit 114 through system bus 112. Memory 116 may include, for example, ROM 122, used to permanently store information, and/or RAM 124, used to temporarily store information. ROM 122 may include basic input/output system ("BIOS") having one or more routines that are used to establish communication, such as during start-up of computing network 110. RAM 130 may include one or more program modules, such as one or more operating systems, application programs, and/or program data.

One or more mass storage devices 118 may comprise a single unit with central processing unit 114 and memory 116. One or more mass storage devices 188 are optionally disposed in communication with central processing unit 114 and memory via computing network 110. Examples of mass storage devices 118 include hard disk drives, magnetic disk drives, tape drives, optical disk drives, and other computer-readable media known in the art. Mass storage device(s) 118 and corresponding computer readable media provide nonvolatile storage of data and/or executable instructions that may include one or more program modules such as an operating system, one or more application programs, other program modules, or program data, such executable instruction are examples of program code meant for implementing steps of methods disclosed herein.

One or more network interfaces 120 may be employed to enable a user to input data and/or instructions to computing network 110 through one or more corresponding input devices 152 on network-enabled device 150. Examples of such input devices include keyboard and alternative input devices, such as a pointing device (e.g., mouse, light pen, stylus), touch screen, microphone, a joystick, a game pad, a scanner, a digital camera, and the like. Similarly, examples of input interfaces 120 that may be used to connect the input devices 132 to the system bus 112 include, serial port, a parallel port, a universal serial bus ("USB"), a fire wire (IEEE I394), a wireless communication interface, or another interface.

One or more network interfaces 120 enable computing network 110 to exchange information with one or more other local or remote computer devices 126 or databases 128, via a network 130 that may include hardwired and/or wireless links. Examples of network interfaces include a network adapter for connection to a local area network ("LAN") or a modem, wireless link, or other adapter for connection to a wide area network ("WAN"), such as the Internet. Network interface 120 may be incorporated with or secondary to central processing unit 114, memory 116, and/or mass storage device 118. In a networked system, accessible program modules or portions thereof may be stored in a remote storage device. Furthermore, computing network 110 may participate in a distributed computing environment, where functions or tasks are performed by a plurality of networked computer devices 126.

Examples of network-enabled device 150 include a desktop or laptop computer, a wireless "smart" phone, a tablet computer, a personal digital assistant (PDA), or a handheld shopping device. Network-enabled device 150 is connected to computing network 110 by a wired or wireless connection 200, such as through an internet service provider, public wireless access, private wireless router, satellite communication or the like. Network-enabled device 150 is equipped with at least one data gathering device 152, one or more output devices 154, a network interface 156, and one or more processors 158. Data gathering device 152 may be a keyboard, touch screen, bar code reader, camera, RFID reader, optical reader, and/or other data gathering equipment configured to obtain a product identity of a particular product. Data gathering device 152 can be integrated into or in communication with display eyewear or contact lenses.

Output device 154 is one or more devices such as a display screen, printer, speaker, vibration alert, and the like. Output device 154 is used to display or otherwise communicate a rating of product 180 to the user. The rating may be communicated using network-enabled device 150, for example, by displaying a number, text, a symbol, a graph, a color, printout, or other representation; by playing a sound or audible message; by producing a tactile alert, such as vibrating, or by communicating the rating by sending a message, such as a text message or email message.

Network interface 156 is an input/output interface configured for wired or wireless communication with computing network 110, such as a local area network, wide area network, or the Internet. One or more network interfaces 156 may be employed to communicate with computing network 110. A particular output device 154 may be intergraded into or external to network-enabled device 150. Communication between network-enabled device 150 and output device 154 is accomplished by one or more output interfaces 158, such as a video adapter, an audio adapter, a parallel port, a wireless interface (e.g., blue tooth), network communication interface, and the like.

Network-enabled device 150 may be used in various environments to input a product identifier 190 and communicate with computing network 110 to determine economic impact information for product 180. For example, network-enabled device 150 is used in a retail store, at home, at an office, or in public to input a product identifier of product 180 to computing network 110. Product 180 can be one or more goods or services in tangible or intangible forms.

One example of system 100 is a single retail store where computing network 110 is a single desktop computer with network interface 120 being a wireless router. The desktop computer includes central processing unit 114, memory 116, and mass storage device 118 with a database 128. The store's computing network 110 is accessible only to the store employees and to customers of the store via store-provided network-enabled devices 150. Network-enabled devices 150 are store-owned handheld shopping devices capable of scanning barcodes and displaying economic impact ratings on a display panel on the handheld shopping device. Customers of the store use the handheld shopping devices to scan products offered at the store and view an economic impact score for the scanned product.

Another example of system 100 is where computing network 110 includes many central processing units 114, computing devices 126, memory 116, mass storage devices 118, and databases 126 connected to and accessible via the Internet. Consumers (individuals, businesses, etc.) can use a computer, smart phone, or other network-enabled device 150 in any location having Internet access to input product identifier(s) 190 and view economic impact scores displayed on network-enabled device 150. In this example, a consumer of goods and services can scan a code on product 180 and then receive the economic impact rating, whether at the point of sale in a retail or wholesale environment, or in one's home or business while viewing potential products online.

In one embodiment, network-enabled device 150 is in a first location and communicates with computing network 110 (or portions of computing network 110) located remotely in a second location. As discussed in the example of a single retail store environment, all or part of computing network 110 may be located in a second location that is close to network-enabled device(s) 150, such as in the same building. Portions of computing network 110, such as one or more database 128, may be located great distances from network-enabled device. Method With reference to FIG. 2, a flowchart illustrates steps performed in one embodiment of a method 500 of rating product 180, where the score or rating output to the user is based on economic values associated with product 180 and the economic impact attributed to product 180 for a local, state, regional, national, or other geographic region referred to as the perimeter of interest.

In step 502, network-enabled device 150 (e.g., a desktop computer, smart phone, or tablet computer) is used to obtain or receive a product identifier 190 of product 180 (shown in FIG. 1). In step 504, network-enabled device 150 communicates product identifier 190 to computing network 110.

Product identifier 190 can be a bar code, QR code, UPC code, ISBN number, or other product identifying information 192 that identifies product 180. Preferably, product identifier 190 uniquely identifies one product only. In other embodiments, product identifier 190 identifies a class or group of products made and/or sold under a brand name and model or other designation that identifies like products with a common brand entity (e.g., light bulbs made by Philips).

In one embodiment, product identifier 190 includes product-identifying information 192. Product-identifying information 192 can be one or more items (e.g, word, number, symbol, image, or phrase) that identify a product or group of products based on information that is typically interpreted by a human. Product identifying information 192 includes, for example, a brand name, model name, model number, color, size, quantity, specification, feature, description, image, trademark, and the like. For example, a user enters "Philips 15-Watt (75 W) LED 6 inch Recessed Downlight Soft White (2700K) Light Bulb" as observed, for example, on a vendor's description, product packaging, advertisement, or review of the product. In another example, the user enters "Phillips model 423517" for the same product. The user enters the information by typing it into a data entry field, by speaking it into a microphone on network-enabled device 150, by scanning or photographing the description, or by selecting text in a document, webpage, or other computer file.

In another embodiment, product identifying information 192 is an image of product packaging or product 180. For example, a consumer shopping online may select an image of product 180 as viewed on a website or may upload the user's own image of product 180 using network-enabled device 150. In such an embodiment, an image may be compared with data or images in database 128 to identify product 180. Alternately, method 500 incorporates image analysis software to analyze the shape, size, color, text, numbers, geometry, and relative dimensions to identify what the product is and, if possible, its source. If insufficient information is available from the image, method 500 optionally prompts the user to try again or to enter additional information, such as brand name, model number, or a code.

Product identifier 190 is input by input device 152 scanning, photographing, or reading information, or by the user manually entering data to network-enabled device 150. For example, a smart phone is used to read a bar code from product packaging, where input device 152 is the phone's camera configured with software for reading bar codes. As another example, the user manually types in the bar code digits using a computer keyboard or by speaking the digits to network-enabled device 150 equipped with a microphone and voice recognition software. In another example, the user types in a description of product 180.

In one embodiment, network-enabled device 150, such as a smart phone equipped with a camera configured to read bar codes, is positioned near product identifier 190 (e.g., bar code) on product 180, so that the phone can receive a particular data set based on the white and black regions of the bar code. The received data will most likely contain a twelve digit number known as a Universal Product Code (UPC) and based on a Uniform Commercial Code standard. The first six digits of a UPC code identify the manufacturer, the next five digits are a product identification number, and the last digit is a check digit. Various other bar codes or UPC formats may be utilized, including zero-compressed UPC codes and the like. The bar code may be sufficient to identify product 180 and for accessing additional information related to product 180. Alternately, the bar code (or other product identifier 190) is compared with information stored on computing network 110 or network-enabled device 150 to identify product 180 and to obtain additional information related to product 180. For example, database 128 stored in or accessible by network-enabled device 150 includes UPC codes and custom product codes used to determine the product name and identify the location of information on computing network 110 related to product 180.

In step 506, computing network 110 determines the product identity. Step 506 may be performed, for example, by analyzing product identifier 190. In other embodiments, network-enabled device 150 communicates product identifier 190 to computing network 110 in step 504. Product identifier 190 is then compared with information in one or more databases 128 to identify product 180. In one embodiment, product identifier 190 is compared to database values for a match, where a match indicates a product identity. In some embodiments, an exact match is not required and a tolerance value is considered to be a match when within a predefined or adjustable tolerance value. For example, eleven bar code digits entered to network-enabled device 150 are correct, but omit a twelfth number (e.g., the check digit). If the eleven digits match a database value, then this would be considered a match. Similarly, all twelve bar code numbers are entered, but one of the numbers is incorrect. Matching eleven of twelve numbers may be considered a match. A tolerance value is optionally set to achieve the desired performance of method 500.

Similarly, when product identifying information 192 is input, one or more database values are examined for matching information. In one embodiment, product identifying information 192 is matched for relevance, accuracy, and other qualities as is performed, for example, in an Internet keyword search and as is known in the art.

In optional step 508, computing network 110 communicates a product identity to network-enabled device 150 for confirmation by the user. For example, after scanning and uploading a bar code to computing network 110, a product is identified in step 506. The user then receives a description, image, or other identifying information 192 and is prompted to confirm the identity of the product. Step 508 is preferably performed when multiple matches or no exact match for product identity are found in step 506.

In one embodiment, method 500 includes optional step 510 of determining a location of network-enabled device 150. Step 510 may be performed, for example, by using GPS data, the user inputting a location, determining a location based on connection 200 to the Internet, and/or identifying a network component (e.g., a router) as belonging to an owner or being positioned in a known location. For example, businesses that provide wireless Internet access have a wireless router that is used to identify the business and/or location of network-enabled device 150. The location of network-enabled device 150 may be used to define a perimeter of interest, which is discussed below regarding step 512.

In step 512, method 500 defines one or more geographic perimeter of interest. Optionally, method 500 also defines one or more additional perimeter of interest and an extra-perimeter territory. The perimeter(s) of interest and any additional perimeter(s) of interest is the geographic region(s) in which the economic impact values are calculated and the region(s) on which the economic impact rating is based. The extra-perimeter territory is a geographic region outside of the perimeter(s) of interest. For example, a user selects the United States as the perimeter of interest and Great Britain as an additional perimeter of interest. The extra-perimeter territory would then be the world except for the US and Great Britain. In optional step 516, network-enabled device 150 receives an input from the user for defining the perimeter(s) of interest, additional perimeter(s) of interest, and extra-perimeter territories. For example, network-enabled device prompts the user to enter or select the name of a geographic region, enter a code, select a region on a map, confirm or accept a default setting for the perimeter of interest, or supply any other input to network-enabled device 150 that defines a perimeter of interest.

The perimeter of interest can be defined in many ways and for many different geographic regions. In many cases, the perimeter of interest will be selected as a country or continent. In other cases, however, a much smaller region may be selected as a perimeter of interest. In one embodiment, the perimeter of interest is defined by the country in which the user's network-enabled device is located. The location is determined, for example, by GPS, by determining the location of the IP address of the network-enabled device, or by prompting the user to enter a location.

In another embodiment, the perimeter of interest is defined by the user inputting or selecting the name of a city, county, state, region, country, continent, or other geographic region. For example, the user inputs "New England" or selects the name from a list to define the perimeter of interest as the six states of the New England region of the United States. Another method is to use postal codes, country codes, phone number area codes, or other codes to define a region. Another method is for the user to select regions on a map shown to the user, where the user clicks (using a mouse or pointing device), touches (using a touch screen), or otherwise selects a region on a map displayed on network-enabled device 150. Another method is for the user to specify a radius from a starting point, where the perimeter of interest is defined by a circle with its center at the starting point and having the specified radius (e.g., within 200 miles of user's current location). For example, network-enabled device uses GPS to determine the current location and prompts the user to select a radius to define the perimeter of interest. Step 512 optionally incorporates global positioning technology to define or provide an initial location used to define a perimeter of interest.

For example, based on a starting point (e.g., set by default as the user's current location or country where network-enabled device 150 is used), the user may define the perimeter of interest by indicating a radius from the user's location or by inputting the size of the region surrounding the user's current location. For example, the user's current location is identified by GPS to be the center of Boston and set as the initial location. The user then selects a radius beyond the initial location or indicating geographic descriptors such as city, county, state, or region, to define the perimeter of interest that includes the initial location. Similarly, the user's current location anywhere in a country could be used to set the default perimeter of interest as the extent of that country. For example, a user located anywhere in the US uses network-enabled device 150 with a default perimeter of interest set as the current country in which the user is located, which is the US.

The limit of the extra-perimeter territory may optionally be set by the user to define a geographic region that includes the perimeter(s) and additional perimeter(s) of interest. In one embodiment, the default setting for the extra-perimeter territory is the world. Optionally, the user may set or determine the boundary of the extra-perimeter territory, where the extra-perimeter territory is as large as the world or may be specified as any region that is larger than and includes selected perimeter(s) of interest. For example, for perimeters of interest are selected as two US states, the extra-perimeter region is defined as the United States based on user input or a default setting. Therefore, the extra-perimeter territory would be the region(s) outside the perimeters of interest (the selected states) and within the boundary of the United States. In this example all US states other than the selected states are the extra-perimeter territory. Preferably, if the extra-perimeter region is not defined by user input, then the extra-perimeter territory is all regions outside of the perimeter(s) of interest by default.

In step 518, based on the product identity determined in step 506 and optionally confirmed in step 508, computing network 110 calculates or obtains one or more vendor values from a database. Vendor values include an industry number or classification for product 180, a product price (e.g., average retail price of product 180) and the identity of one or more vendors (retail store, wholesale vendor, or other location of purchase). In one embodiment, the product price is the actual price of product 180 for sale at a particular vendor. For example, when method 500 is performed based on a product identity determined from information obtained from a vendor's website, from within vendor's brick-and-mortar store, or by specifying the vendor selling the product, step 518 uses the actual price of product 180 as it is available for purchase from the selected vendor. In other embodiments, an average product price in the perimeter of interest, a manufacturer's suggested price, or a price stored in database 128 is used. In one embodiment, an average product price is calculated within the perimeter of interest by using the product identity to obtain a plurality of vendors and sampling prices among those vendors. The product price is then taken as the average of sampled prices. The average product price may be a stored value in database 128 that is updated periodically, or may be a value that is determined each time method 500 is performed so that the price is accurate at the time of rating product 180.

The product identity is also used to determine one or more vendors offering product 180 for sale. Vendors can be determined by method 500 performing an Internet search and extracting retail or vendor information from the search results. In another embodiment, vendor information is determined by accessing information stored in database 128. Vendor information can be used in determining a financial impact to a specified geography. For example, a product that is widely available throughout a country would have many retailers and/or vendors. Having many retailers or vendors optionally triggers method 500 to use average regional values for selling price, expenses, costs, and other values. In contrast, a product sold only at a small number of stores in a limited area can be analyzed based on actual values for each vendor.

In step 520, one or more economic values attributed to product 180 are determined for the perimeter of interest. In one embodiment, economic values include financial information about a brand entity of product 180. In other embodiments, economic values attributed to product 180 include values for brand entities and supply chain entities.

The product identity or product identifier is used to determine or access other information about the product, including the product's brand entity and supply chain entities. The brand entity may be included in product identifier 190 (e.g., the first six digits of a bar code) 190. Alternately, the brand entity may be determined by accessing additional information associated in database 128 with product identifier 190. In some cases, the brand entity and the manufacturer are different entities, such as when the underlying product is made by one entity, but labeled and sold by a separate brand entity. In such a case, the manufacturer would be considered a supply chain entity.

Economic values for a brand entity or supply chain entity include but are not limited to the entity's financial data as is contained in an annual report, such as revenue, expenses, profits, salaries and wages paid, revenues attributed to sales of product 180, taxes paid, fines, and charitable contributions (time, money). Economic values include expenses and costs of making and selling product 180, such as the cost of goods sold (e.g., materials, parts, and labor); selling, general, and administrative costs (SGA); and the amount or cost of input to product 180 from regions outside the perimeter of interest (sometimes referred to as "foreign inputs" when discussed relative to a national perimeter of interest). Economic values are preferably determined using generally accepted accounting principles (GAAP) and definitions. In one embodiment, economic values are determined separately or together for the brand entity, its subsidiaries, and any parent companies. In one embodiment, economic values are determined only for the perimeter(s) of interest, but may also be determined for all regions of the world and analyzed based on the selected perimeter(s) of interest.

In other embodiments, economic values are determined for the perimeter(s) of interest, additional perimeter(s) of interest, extra-perimeter territories, and/or the brand entity as a whole. In one embodiment, the location of a brand entity (or parent company or subsidiary) is the location of its principal place of business. For example, step 520 determines a revenue amount (e.g., the total revenue of a brand entity located within the perimeter of interest), a wages paid amount (e.g., the total compensation paid to employees of the brand entity who reside within the perimeter of interest, including salaries, wages, and stock-based compensation), a taxes paid amount (income taxes, property taxes, and other taxes), and/or a charitable contribution amount for the brand entity (e.g., total amount of charitable contributions made by the brand entity to charities located within the perimeter of interest). Economic values can be expressed in currency terms, as an amount per unit of product 180, an amount per currency unit of product price, a percentage of product price, or some other quantity.

In one embodiment, the charitable contribution amount is the total monetary amount given by the brand entity to charities as defined in the 2013 Internal Revenue Code at 26 U.S.C. §501(c)(3) as "corporations, and any community chest, fund, or foundation, organized and operated exclusively for religious, charitable, scientific, testing for public safety, literary, or educational purposes, or to foster national or international amateur sports competition (but only if no part of its activities involve the provision of athletic facilities or equipment), or for the prevention of cruelty to children or animals, no part of the net earnings of which inures to the benefit of any private shareholder or individual, no substantial part of the activities of which is carrying on propaganda, or otherwise attempting, to influence legislation (except as otherwise provided in subsection (h)), and which does not participate in, or intervene in (including the publishing or distributing of statements), any political campaign on behalf of (or in opposition to) any candidate for public office." In other embodiments, generally accepted accounting principles (GAAP) or international financial reporting standards (IFRS) are used to define charity and charitable contribution amounts and other economic values.

Economic values are scaled to represent the amounts attributable to product 180 by multiplying the economic value for the brand entity by the ratio of revenue attributable to product 180 to total brand entity revenue. For example, the charitable contribution amount attributable to product 180 is determined by multiplying the total charitable contribution amount by the ratio of revenue attributable to product 180 to total revenue. The revenue amount for product 180 is the total cash or credit, before expenses, received by the brand entity for sales of product 180, whether product 180 is sold directly to customers or wholesale to retailers or distributors. The total brand entity revenue is the total revenue received by the brand entity from all sources including revenue attributable to product 180. Revenue amounts do not include retail markups, sales taxes, customer shipping charges, or other amounts included in or added to the product price that are not received by the brand entity. In one embodiment, the revenue amount is an expected or forecasted revenue amount calculated from data available at the time of analysis and using forecasting techniques known in the art, such as historical extrapolations, modeling, and regression analysis.

In one embodiment, one or more of economic values are obtained from database 128 created and maintained with data to be used for method 500. Values input to and stored in database 128 may be the result of research, information requests, public records, information supplied directly from brand entities. For example, one or more economic values are obtained by computing network 110 accessing, reading, and extracting information from public documents, state filing documents, and/or federal filing documents using electronic document retrieval, text recognition, data parsing, and data crawling techniques known in the art. For example, brand entity financial information is obtained by retrieving an annual 10K report of a brand entity from the EDGAR database of the US Securities and Exchange Commission, extracting total revenues, expenses, and other financial data, and storing the values in database 128 or memory 116 of computing network 110 for use in calculations and determinations.

In one embodiment, economic values are determined in step 520 only for a brand entity. Optionally, economic values are determined for one or more supply chain entities. Supply chain entities are intermediate entities that provide services or goods to the manufacturer and/or vendor(s) to bring product 180 to market. Supply chain entities include distributors, shipping companies, parts suppliers, materials suppliers, manufacturers, and other entities involved in making and bringing product 180 to market.

Referring to FIG. 3, step 520 optionally includes step 520a of determining a brand entity, step 520b of determining brand entity economic values attributed to product 180, step 520c of identifying one or more supply chain entities, and step 520d of determining supply chain economic values for product 180. For example, step 520c is performed by computing network 110 retrieving a list of supply chain entities from database 128. Economic values are then determined for one or more supply chain entities in step 520d.

In one embodiment, economic values of supply chain entities are determined only for the perimeter(s) of interest. In other embodiments, supply chain financial information is determined for one or more regions that include the perimeter(s) of interest, additional perimeter(s) of interest, extra-perimeter territories, and any other location. For example, step 520d determines the amount of money paid to parts suppliers located within the perimeter of interest, where the amount paid is for parts used to make product 180. Step 520 also determines the amount paid to entities within an additional perimeter of interest for shipping and transportation between manufacturer and vendors, costs which would be included as part of selling, general, and administrative costs (SGA) for product 180. When a supply chain entity provides goods or services for multiple products of a manufacturer, the total amount paid to the supply chain entity is scaled to reflect the portion of the total amount that is attributable to product 180.

Referring again to FIG. 2, optional step 522 determines an industry classification number for product 180. In one embodiment, step 522 accesses GICS (global industry classification standard), RGS (Russell global sectors), or ICB (industry classification benchmark) classification systems stored in one or more database 128 of computing network 110.

In step 524, weight factor values are optionally set or determined for each impact value component. In one embodiment, weight factor values are predetermined values. In other embodiments, the user has the option to prioritize impact values to give one component more weight than another. For example, if charitable contributions are more important to the user's decision than taxes paid by the brand entity, the user selects the charity component as having a higher priority in the list of components to be considered, thereby giving the charity component weight factor a higher value than the taxes component weight factor. In one embodiment, the sum of weight factor values equals one. For example, a charity weight factor is between 0.05-0.25, a wages weight factor is from 0.15-0.25, ancillary effects weight factor is between 0.15-0.50, a taxes weight factor is from 0.05-0.30, and a deflator weight factor is from 0.01-0.30.

In step 526, one or more economic impact values are calculated. In one embodiment, economic impact value components are calculated for the perimeter(s) of interest. Economic impact value components are based on the economic values determined in step 520 and are scaled to represent the values attributable to product 180 by multiplying by the ratio of entity revenue for product 180 to the total entity revenue. In one embodiment, impact values include one or more components that include a charity component, a taxes component, a wages component, an ancillary effects component, and a deflator component.

In one embodiment, calculations and determinations, such as in steps 518, 520, 524, 526, and 528 of method 500 use one or more of the following expressions:

$$\text{Charity component, } C_{Ch} = (W_{Ch} \cdot Ch \cdot A)/(B \cdot P_{avg} \cdot N) \quad (1)$$

$$\text{Taxes component, } C_{tax} = (W_{tax} \cdot T_{tot} \cdot A)/(B \cdot P_{avg} \cdot N) \quad (2)$$

$$\text{Wages component, } C_{wag} = (W_{Wag} \cdot Wag \cdot A)/(B \cdot P_{avg} \cdot N) \quad (3)$$

$$\text{Ancillary effects component, } C_{AE} = (W_{AE} \cdot AE_{POI})/(N \cdot P_{avg}) \quad (4)$$

$$\text{Ancillary effects amount, } AE = (COGS_{POI} + SGA_{POI}) - (COGS_F + SGA_F) \quad (5)$$

$$\text{Deflator component, } C_D = W_D \cdot D \quad (6)$$

$$\text{Deflator value, } D = (P_{avg} - P_{comp})/P_{avg} \quad (7)$$

$$\text{Perimeter Premium } PP = P_{avg} - P_{comp} \quad (8)$$

$$\text{Numerical Rating, } R = C_{Ch} + C_{tax} + C_{Wag} + C_{AE} - C_D \quad (9)$$

Variables and subscript designations in expressions 1-9 are defined as follows with the units indicated in parentheses:
  A=entity revenue from product 180 (in currency)
  B=total entity revenue (in currency)
  Ch=charity amount paid (in currency)
  N=number of units produced of product 180 in a predefined reporting period
  $P_{avg}$=average purchase price per unit of product 180 in the perimeter of interest during a predefined reporting period (currency per unit)
  $P_{comp}$=average price in perimeter of interest for comparable product of this type during a predefined reporting period (in currency)
  $W_x$=weight factor for value x (a positive, dimensionless number)
    $W_{Ch}$=charity weight factor
    $W_{tax}$=tax weight factor
    $W_{Wag}$=wages weight factor
    $W_{AE}$=ancillary effects weight factor
    $W_D$=deflator value weight factor
  $T_{tot}$=total entity taxes amount paid (in currency)
  $T_{prod}$=entity taxes paid attributable to product 180 (in currency)
  Wag=wages and salaries paid and attributable to product 180 (in currency)
  AE=Ancillary effects amount for perimeter of interest (in currency)
  $COGS_{POI}$=cost of goods sold in perimeter of interest (in currency)
  $SGA_{POI}$=selling, general, and administrative expenses for perimeter of interest (in currency)
  $COGS_F$=cost of goods sold- outside POI (in currency)

SGA$_F$=selling, general, and administrative expenses outside POI (in currency)
POI=perimeter of interest
F=outside perimeter of interest Selling, general and administrative expenses, indicated by SGA in the variables list above, is the sum of all direct and indirect selling expenses and all general and administrative expenses of an entity. Direct selling expenses are expenses that can be directly linked to the sale of product 180, such as credit, warranty and advertising expenses. Indirect selling expenses are expenses which cannot be directly linked to the sale of a specific unit, but which are proportionally allocated to all units of product 180 sold during a certain period, such as telephone, interest, and postal charges. General and administrative expenses include overhead expenses, such as salaries of non-sales personnel, rent, and utilities.

The charity component represents the amount of charitable contributions paid to charities within the perimeter of interest and attributable to product 180. The charity component optionally includes a monetary value assigned to charitable donations of time. In one embodiment, for example, a monetary amount is used as a value for volunteer time, where volunteer time is given a value based on the type of volunteer work performed and the going market rate for that type of work. In one embodiment, the charity component $C_{Ch}$ is calculated using expression (1) above.

A taxes component represents taxes paid to recipients within the perimeter of interest and attributable to product 180. In one embodiment, taxes paid includes business income taxes property taxes, import taxes, export taxes, and other taxes paid by the manufacturer to a taxing authority within the perimeter of interest. In one embodiment, the taxes component $C_{tax}$ is calculated using expression (2) above.

A wages component represents the amount of gross wages paid to employees residing within the perimeter of interest. In one embodiment, the amount of wages paid is determined using an estimated number of employees and industry-standard wages for a given type of work as stated, for example, by business and industry reports or other wage and labor data. In other embodiments, the amount of wages paid is the actual amount of wages paid to employees. In one embodiment, the wages component $C_{Wag}$ is calculated using expression (3) above.

An ancillary effects component $C_{AE}$ is an impact value that accounts for the portion of total input costs that is within the perimeter(s) of interest for product 180. Values included in the ancillary effects component $C_{AE}$ include the cost of goods sold for product 180 (e.g., materials, parts, and manufacturing labor in the perimeter of interest), plus the selling, general, and administrative (SGA) expenses in the perimeter of interest, less expenses from inputs (COGS) and selling, general, and administrative (SGA) costs outside of the perimeter of interest. In one embodiment, the ancillary effects component $C_{AE}$ is the product of a weight factor and the total ancillary effects value per unit of product 180 divided by the purchase price of product 180. In one embodiment, the ancillary effects component $C_{AE}$ is calculated using expressions (4) and (5) above.

A deflator component $C_D$ is an impact value that accounts for the difference between the average price of product 180 and the average price of a comparable product of this type. In one embodiment, an additional product, such as a product comparable to product 180, is determined based on the product identifier of product 180. By comparing the average price of product 180 and the average price of a comparable product of this type, the product price of product 180 is considered in the product rating to reflect the idea that low prices leave consumers with more money to purchase other products, thereby increasing overall economic prosperity. In one embodiment, deflator component $C_D$ is calculated using expressions (6), (7), and (8) above.

In one embodiment, a comparable product is defined as one in the same industry classification number with the same or similar features, where the features include average price and performance features. To determine comparable products in one embodiment of method 500, a group, class, subclass, and/or additional classification data are used to determine comparable products. Classification systems useful for this calculation include Global Product Classification (GPC), Central Product Classification (CPC), the Harmonized Commodity Description and Coding System (HS), Standard International Trade Classification (SITC), and the United Nations Standard Products and Services Code (UNSPSC).

In one embodiment, determining a comparable product for product 180 in a given classification code, sub-classification codes are compared with other products having the same classification code. In one embodiment, a database is established that contains sub-classification codes for a variety of products and that describe attributes of the individual products. A match between one or more sub-classification codes indicates a comparable product.

For a laser printer, for example, sub-classification codes are compared for other printers having the same product classification code. Sub-classification codes indicate size, printing speed, color or black-and-white printing, print resolution, scanning ability, wireless communication, and other such features. Thus, a match between some or all of the sub-classification codes indicates whether the item is comparable to product 180. In one embodiment, having at least a predefined number of matching sub-classification codes of the total number of sub-classification codes determines whether a product is comparable to product 180. In other embodiments, a product comparable to product 180 is determined by system 100 referencing a list stored in database 128 of comparable products for product 180. In some embodiments, the user is prompted to enter a product identifier 190 for an additional or comparable product. For example, network-enabled device 150 prompts the user to scan or enter a product identifier 190 for an additional product. Thus, when a consumer is deciding between two products available for sale, whether one of the products is comparable to the other or not, system 100

In some embodiments, impact values include one or more other adjustment component or adjustment factor that represents moral considerations, behavior of the brand entity, and other effects on the perimeter of interest. These considerations could be use of "sweatshop" labor, environmental impact due to pollution, the manner in which raw materials are consumed and the type of materials consumed, political concerns, and the like. In one embodiment, an adjustment component is a positive or negative number included in the sum of impact value components. For example, adjustment value considers an environmental impact measured in terms of calculated damage to the environment and includes health care costs related to product 180, costs of cleaning or treating polluted waterways due to product 180, and fines for failure to comply with environmental regulations. Thus, a manufacturer that otherwise benefits a perimeter of interest by bringing in revenue and making charitable contributions can have an overall lower numerical impact score due to including a negative adjustment component in the sum of impact value components. In other embodiments, an adjustment factor is a multiplier used to adjust the sum of impact value components, where the adjustment factor is a positive number typically close to one. A value of adjustment factor below one results in a downward adjustment of impact values; a value of adjustment factor above one results in an upward adjustment of impact values.

Preferably, impact values are calculated on a per-unit basis. In other embodiments, for example, impact values are calculated in terms of an overall value, on a per-dollar (or other currency) basis, or on a percentage of purchase price basis. Thus, in comparing products, the consumer may compare economic impact values using different reference points. This is useful, for example, when comparing two competing products having different prices, where one product has higher impact values on a per-product basis, but may have lower impact values on a per-dollar basis.

Preferably, each value determined in method 500 has one or more accompanying values that represent the chosen value in one or more other geographic regions. For example, determining the supply chain financial value of shipping costs for products 180 within the perimeter of interest would also determine shipping costs for products 180 in the extra-perimeter region. That is, values are preferably determined for all geographic regions throughout the world. Using this information, network-enabled device 150 optionally displays economic impact scores for perimeter(s) of interest but also for other regions. For example, network-enabled device 150 displays a color-coded map to illustrate economic impact scores world-wide, country-wide, or for other geographic regions. Thus, similar to a weather map showing temperatures by color, the user may see regions on a map with colors corresponding to impact values for product 180. Using such a map, the user may visually locate regions that benefit from sales of product 180, whether local, state, national, or foreign. Similarly, numerical or symbolic ratings may be represented on a map or in a list for the user. In this way, the user may quickly determine not only an economic impact rating for a perimeter of interest, but also can determine what other regions benefit financially from the sale of product 180.

In step 528, an economic impact rating is determined based on the impact value components. Economic impact ratings may be calculated for the perimeter(s) of interest, additional perimeter(s) of interest, the extra-perimeter region, and/or any other region. In one embodiment, the economic impact value components are summed to arrive at a numerical value for the economic impact rating. In step 530, adjustment values are optionally included in calculating a numerical score. One example of an adjustment value is deflator component discussed above.

In step 532, the numerical product score determined in step 528 is optionally correlated with a rating scale for the industry classification number of product 180. In some industries, an excellent numerical score would be considered poor compared to the numerical scores of other industries.

In step 534, based on the numerical score and/or the correlation of steps 528 and 532, respectively, method 500 displays or outputs to the consumer an economic impact rating or score for product 180. The rating may be a number, symbol, color, chart, graph, map, grading, message, printout, alert, or other indicator of the product's economic impact within the perimeter of interest. Preferably, network-enabled device 150 has a display screen configured to display the product rating for product 180.

The user may optionally input user preferences to customize the method to consider or not consider certain factors, or to weigh certain factors more heavily. For example, a consumer who is concerned about abusive labor practices may assign a higher weight to that factor; a consumer who wants products with a minimum local financial benefit may include this information in the rating calculation. Absent any user preference, method includes economic impact values and chooses weight factors based on default settings. In one embodiment, default settings are established by the user when operating the method for the first time and may be updated as needed to suit the user's preferences. In other embodiments, default settings are established by a network administrator. In another embodiment, default settings are determined by selecting the most popular choices as observed by users of method 500. The user may be prompted to select or choose how defaults values are set and whether to accept the default or specify values that suit the user's preferences.

Example Implementation of Method 500

Referring now to Table 1 below, an example implementation of steps in method 500 is discussed. Table 1 shows calculations and values side-by-side for two competing products. The calculations shown in Table 1 are for products X and Y that have been identified in steps 502 and 506 and where the perimeter of interest was defined as the United States in step 512. The first product, product X, is made in China. The second product, product Y, is made in the United States. As shown in lines 2 and 3 of Table 1, this example is one in which 100% of the revenue of each brand entity is from selling its respective product. Thus, as shown below in line 42, when values (e.g., brand entity revenue) are scaled to be attributable to product 180, a value of one is used for the scaling factor A/B because the ratio of revenue from product 180 to the total entity revenue equals one.

TABLE 1 example calculations for competing products X and Y

| Line | Input | Product X ("Made in China") | Product Y ("Made in USA") |
|---|---|---|---|
| 1 | Perimeter of Interest (POI) = United States | | |
| 2 | A: brand entity revenue for product | $22,810,800.00 | $11,750,000.00 |
| 3 | B: total brand entity revenue | $22,810,800.00 | $11,750,000.00 |
| 4 | N: Number of units manufactured this period: | 57,027 | 25,000 |
| 5 | $P_{avg}$: Average price to consumer per unit in POI | $400.00 | $470.00 |
| 6 | COGS: total cost of goods sold for product | $17,000,000.00 | $8,000,000.00 |
| 7 | SGA for product | $944,958.00 | $583,586.00 |
| 8 | FI: all input expenses-outside POI | $14,500,000.00 | $3,000,000.00 |
| 9 | Ch: total charity amount paid in POI | $1,000,000.00 | $1,000,000.00 |
| 10 | Wag: total employment wages paid in POI | $8,000,000.00 | $10,000,000.00 |

TABLE 1-continued example calculations for competing products X and Y

| Line | Input | Product X ("Made in China") | Product Y ("Made in USA") |
|---|---|---|---|
| 11 | $T_{tot}$: Total taxes paid in POI | $3,000,000.00 | $2,500,000.00 |
| 12 | Industry classification number for product | 566 | 566 |
| 13 | $P_{comp}$: Average price in POI for a comparable product of this type | 435 | 435 |
| 14 | Change in price from average price for comparable product = $P_{comp} - P_{avg}$ = (line 13 − line 5) | $35.00 | ($35.00) |
| 15 | D = deflator value = change in price from average price divided by $P_{comp}$ = (line 14)/(line 13) | 0.08045977 | (0.08045977) |
| 16 | | | |
| 17 | Weight factors: | | |
| 18 | $W_{AE}$: weight factor for AE component | 0.30 | 0.30 |
| 19 | $W_{Ch}$: weight factor for charity component | 0.15 | 0.15 |
| 20 | $W_{tax}$: weight factor for taxes component | 0.15 | 0.15 |
| 21 | $W_{Wag}$: weight factor for wages component | 0.35 | 0.35 |
| 22 | $W_D$: weight factor for deflator component | 0.05 | 0.05 |
| 23 | | | |
| 24 | | | |
| 25 | I. Total Input Costs | | |
| 26 | Total expenses for product: (COGS + SGA) for all regions = line 6 + line 7 | $17,944,958.00 | $8,583,586.00 |
| 27 | Total expenses outside of POI, line 8 | $14,500,000.00 | $3,000,000.00 |
| 28 | Total expenses within POI by subtracting line 27 from line 26: | $3,444,958.00 | $5,583,586.00 |
| 29 | | | |
| 30 | II. Change in Price Calculation | | |
| 31 | $P_{avg}$: Average price to consumer per unit of product, line 5 | $400.00 | $470.00 |
| 32 | $P_{comp}$: Average price for comparable product of this type, line 13 | $435.00 | $435.00 |
| 33 | Change in price by subtracting line 32 from line 31: | ($35.00) | $35.00 |
| 34 | | | |
| 35 | III. Input Expenses outside perimeter of interest = $COGS_F + SGA_F$ | | |
| 36 | Services (including direct labor) purchased from firms outside the perimeter of interest | $3,000,000.00 | $1,000,000.00 |
| 37 | Goods purchased from firms outside the perimeter of interest | $6,000,000.00 | $1,000,000.00 |
| 38 | Materials (inputs) purchased from firms outside the perimeter of interest | $5,500,000.00 | $1,000,000.00 |
| 39 | FI: Total input expenses outside the perimeter of interest = sum of lines 36 through 39 | $14,500,000.00 | $3,000,000.00 |
| 40 | | | |
| 41 | IV. Total Charity in Perimeter of Interest | | |
| 42 | Scaling factor, A/B = Revenue from Product/Total entity Revenue = line 2/line 3 | 1 | 1 |
| 43 | $Ch_{POI}$: Total Charity in POI | $1,000,000.00 | $1,000,000.00 |
| 44 | Total charity for product in POI = (A/B) · $Ch_{POI}$ = line 42 * line 43 | $1,000,000.00 | $1,000,000.00 |
| 45 | | | |
| 46 | Calculating monetary amounts paid per unit this period | | |
| 47 | Total POI input costs/unit manufactured this period = line 28/line 4 | $60.41 | $223.34 |
| 48 | Total POI Charity Paid/Unit Manufactured this Period = line 44/line 4 | $17.54 | $40.00 |
| 49 | Total POI Taxes Paid/Unit Manufactured this Period = line 11/line 4 | $52.61 | $100.00 |

TABLE 1-continued example calculations for competing products X and Y

| Line | Input | Product X ("Made in China") | Product Y ("Made in USA") |
|---|---|---|---|
| 50 | Total POI employment wages paid/unit manufactured this period = line 10/ line 4 | $140.28 | $400.00 |
| 51 | | | |
| 52 | Calculating monetary amounts per unit as a percentage of average purchase price | | |
| 53 | (POI input costs paid per unit this period)/ average price to consumer per unit = line 47/line 5 | 15% | 48% |
| 54 | (POI charity paid per unit this period)/ average price to consumer per unit = line 48/line 5 | 4% | 9% |
| 55 | (POI taxes paid per unit this period)/ average price to consumer per unit = line 49/line 5 | 13% | 21% |
| 56 | (wages paid in POI per unit this period)/ Avg. Cost to Consumer Per Unit = line 50/ line 5 | 35% | 85% |
| 57 | | | |
| 58 | Calculating weighted economic impact value components as amounts per unit in relation to purchase price | | |
| 59 | $C_{AE}$ = Ancillary effects component = $(W_{AE} \cdot AE)/(N \cdot P_{avg})$ = (line 18)(line 27 − line 39)/(line 4 * line 5) | 0.0453 | 0.1426 |
| 60 | $C_{Ch}$ = Charity component, = $(W_{Ch} \cdot Ch_{POI})/(P_{avg} \cdot N)$ = (line 19 * line 43)/(line 5 * line 4) | 0.0066 | 0.0128 |
| 61 | $C_{tax}$ = Taxes component: $(W_{tax} * T_{POI})/(N * P_{avg})$ = (line 20 * line 11)/(line 4 * line 5) | 0.0197 | 0.0319 |
| 62 | $C_{Wag}$ = Wages component = $(W_{Wag} * Wag_{POI})/(N * P_{avg})$ = (line 21 * line 10)/(line 4 * line 5) | 0.1227 | 0.2979 |
| 63 | $C_D$ = Deflator component = $(W_D)(P_{avg} - P_{comp})$ = (line 22)(line 15) | (0.0040) | 0.0040 |
| 64 | | | |
| 65 | Numerical rating, R = Sum of Weighted impact value component amounts in lines 59-63 | 0.20 | 0.49 |
| 66 | | | |
| 67 | Rating scale for 566 industry: | | |
| 68 | 1 stars | 0.01-0.12 | 0.01-0.12 |
| 69 | 2 stars | 0.13-0.24 | 0.13-0.24 |
| 70 | 3 stars | 0.25-0.33 | 0.25-0.33 |
| 72 | 4 stars | 0.35-0.44 | 0.35-0.44 |
| 73 | 5 stars | 0.45-0.55 | 0.45-0.55 |
| 74 | | | |
| 75 | Symbolic Rating: | 2 stars | 5 stars |

Line 5 of Table 1 shows the results of step 518, where the average price of product 180 $P_{avg}$ is determined for product 180 as a vendor value. Line 12 shows an industry classification number determined or obtained for product 180 as performed in optional step 522. This industry classification number is used later to determine the scale used for comparing the numerical rating value for product 180.

Lines 4 and 6-12 show values determined in step 520 of method 500, where economic values are determined. In this example, these economic values are the number of units manufactured, costs and expenses for product 180, wages paid for product 180, and taxes paid for product 180.

Lines 18-22 show the results of step 524 where weight factor values are determined or assigned. These weight factors are used in step 526 to calculate the weighted economic impact values shown in lines 60-64.

Lines 26-63 represent calculations and determined values of step 526, where economic impact values are determined for product 180.

Line 65 shows the result of step 528 of determining a numerical score or rating R. Here, rating R is the sum of weighted economic values shown in lines 59-63.

Lines 68-73 show the rating scale and corresponding number of stars given in a 5-star rating system for industry classification number 566. The numerical rating R in line 65 is correlated with the rating scale for the 5-star rating system in step 532 to provide the symbolic rating shown in line 75 to be communicated to the user in 534. Here, product X is given two stars and product Y is given 5 stars based on correlating the sum of weighted economic impact values with the rating scale.

Line 75 shows the result that should be displayed in step 534 to a user. For example, two stars would be graphically displayed for product X on the display screen of the user's smart phone. Similarly, five stars are displayed for product Y.

TABLE 2

Example with rating based on four economic impact value components

| | | | |
|---|---|---|---|
| 76 | $C_{AE}$ = Ancillary effects component = $(W_{AE} \cdot AE)/(N \cdot P_{avg})$ = (line 18)(line27 − line 39)/(line 4 * line 5) | 0.0453 | 0.1426 |
| 77 | $C_{Ch}$ = Charity component, = $(W_{Ch} \cdot Ch_{POI})/(P_{avg} \cdot N)$ = (line 19 * line 43)/(line 5 * line 4) | 0.0066 | 0.0128 |
| 78 | $C_{tax}$ = Taxes component: $(W_{tax} * T_{POI})/(N * P_{avg})$ = (line 20 * line 11)/(line 4 * line 5) | 0.0197 | 0.0319 |
| 79 | $C_{Wag}$ = Wages component = | 0.1227 | 0.2979 |
| | $(W_{Wag} * Wag_{POI})/(N * P_{avg})$ = (line 21 * line 10)/(line 4 * line 5) | | |
| 80 | | | |
| 81 | Numerical rating, R = Sum of Weighted impact value component amounts in lines 76-79 | 0.19 | 0.49 |
| 82 | | | |
| 83 | Rating scale for 566 industry: | | |
| 84 | 1 stars | 0.01-0.12 | 0.01-0.12 |
| 85 | 2 stars | 0.13-0.24 | 0.13-0.24 |
| 86 | 3 stars | 0.25-0.33 | 0.25-0.33 |
| 87 | 4 stars | 0.35-0.44 | 0.35-0.44 |
| 88 | 5 stars | 0.45-0.55 | 0.45-0.55 |
| 89 | | | |
| 90 | Symbolic Rating: | 2 stars | 5 stars |

Table 2 above illustrates an example using values from Table 1 where an economic impact rating is calculated based on four economic impact value components. Although the rating scale has been adjusted to account for four components instead of five, the scale remains unchanged in this example.

TABLE 3

Example with rating based on three economic impact value components

| | | | |
|---|---|---|---|
| 91 | $C_{Ch}$ = Charity component, = $(W_{Ch} \cdot Ch_{POI})/(P_{avg} \cdot N)$ = (line 19 * line 43)/(line 5 * line 4) | 0.0066 | 0.0128 |
| 92 | $C_{tax}$ = Taxes component: $(W_{tax} * T_{POI})/(N * P_{avg})$ = (line 20 * line 11)/(line 4 * line 5) | 0.0197 | 0.0319 |
| 93 | $C_{Wag}$ = Wages component = | 0.1227 | 0.2979 |
| | $(W_{Wag} * Wag_{POI})/(N * P_{avg})$ = (line 21 * line 10)/(line 4 * line 5) | | |
| 94 | | | |
| 95 | Numerical rating, R = Sum of Weighted impact value component amounts in lines 91-93 | 0.15 | 0.34 |
| 96 | | | |
| 97 | Rating scale for 566 industry: | | |
| 98 | 1 stars | 0.005-0.10 | 0.005-0.10 |
| 99 | 2 stars | 0.11-0.16 | 0.11-0.16 |
| 100 | 3 stars | 0.17-0.25 | 0.17-0.25 |
| 101 | 4 stars | 0.26-0.32 | 0.26-0.32 |
| 102 | 5 stars | 0.33-0.40 | 0.33-0.40 |
| 103 | | | |
| 104 | Symbolic Rating: | 2 stars | 5 stars |

Table 3 above illustrates an example using values from Table 1 where an economic impact rating is calculated based on three economic impact value components. Although the rating scale has been adjusted to account for three components instead of five, the scale remains unchanged in this example

TABLE 4

Example with rating based on two economic impact value components

| | | | |
|---|---|---|---|
| 105 | $C_{Ch}$ = Charity component, = $(W_{Ch} \cdot Ch_{POI})/(P_{avg} \cdot N)$ = (line 19 * line 43)/(line 5 * line 4) | 0.0066 | 0.0128 |
| 106 | $C_{Wag}$ = Wages component = | 0.1227 | 0.2979 |
| | $(W_{Wag} * Wag_{POI})/(N * P_{avg})$ = (line 21 * line 10)/(line 4 * line 5) | | |
| 107 | | | |
| 108 | Numerical rating, R = Sum of Weighted impact value component amounts in lines 105-106 | 0.13 | 0.31 |
| 109 | | | |
| 110 | Rating scale for 566 industry: | | |
| 111 | 1 stars | 0.005-0.10 | 0.005-0.10 |
| 112 | 2 stars | 0.11-0.15 | 0.11-0.15 |
| 113 | 3 stars | 0.16-0.25 | 0.16-0.25 |
| 114 | 4 stars | 0.26-0.32 | 0.26-0.32 |
| 115 | 5 stars | 0.33-0.40 | 0.33-0.40 |
| 116 | | | |
| 117 | Symbolic Rating: | 2 stars | 4 stars |

Table 4 above illustrates an example using values from Table 1 where an economic impact rating is calculated based on two economic impact value components. The rating scale has been adjusted to account for two components instead of five.

TABLE 5

Example with rating based on one economic impact value component

| | | | |
|---|---|---|---|
| 118 | $C_{Wag}$ = Wages component = $(W_{Wag} * Wag_{POI})/(N * P_{avg})$ = (line 21 * line 10)/(line 4 * line 5) | 0.1227 | 0.2979 |
| 119 | | | |
| 120 | Numerical rating, R = Weighted impact value component amount in line 118 | 0.12 | 0.30 |
| 121 | | | |
| 122 | Rating scale for 566 industry: | | |
| 123 | 1 stars | 0.0-.08 | 0.0 -.08 |
| 124 | 2 stars | 0.09-0.13 | 0.09-0.13 |
| 125 | 3 stars | 0.13-0.20 | 0.13-0.20 |
| 126 | 4 stars | 0.20-0.26 | 0.20-0.26 |
| 127 | 5 stars | 0.27-0.36 | 0.27-0.36 |
| 128 | | | |
| 129 | Symbolic Rating: | 2 stars | 5 stars |

Table 5 above illustrates an example using values from Table 1 where an economic impact rating is calculated based on one economic impact value component. The rating scale has been adjusted to account for one economic impact value component.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A method of rating a product using a system having a network-enabled device disposed in communication with a computing network comprising:
   the computing network receiving a product identifier of a product from the network-enabled device disposed at a first location and in communication with the computing network at a second location;
   the system determining a product price of the product based on the product identifier;

the system determining a brand entity of the product based on the product identifier;

the system defining a geographic perimeter of interest based on input received from the network-enabled device;

the computer network system determining one or more brand entity economic values attributed to the product, the one or more brand entity economic values selected from the group consisting of a revenue amount received by the brand entity, a wages amount paid by the brand entity, a taxes amount paid by the brand entity, and a charitable contribution amount made by the brand entity;

the system calculating an economic impact value component for each of the one or more brand entity economic values, wherein each economic impact value component relates the product price to the one or more brand entity economic values for the geographic perimeter of interest;

the system determining an economic impact rating for the product based on the economic impact value component; and the network-enabled device communicating the economic impact rating for the product to an user of the network-enabled device.

2. The method according to claim 1, further comprising the network-enabled device communicating at least one economic impact value component to the user of the network-enabled device.

3. The method according to claim 2, wherein the at least one economic impact value component is expressed as a percentage of the product price.

4. The method according to claim 1, further comprising the system determining an industry classification for the product based on the product identity, wherein the economic impact rating has a scale based on the industry classification.

5. The method according to claim 1, further comprising the system calculating one or more economic impact value components, wherein the one or more economic impact value components relate the product price to the one or more the brand entity economic values for an extra-perimeter region outside the geographic perimeter of interest.

6. The method according to claim 1, wherein determining the economic impact rating for the product includes calculating a weighted sum of each economic impact value component.

7. The method according to claim 6, wherein the weighted sum is weighted based on user input received by the network-enabled device.

8. The method according to claim 1, further comprising the system determining at least one supply chain entity of the product.

9. The method according to claim 8, further comprising the system determining at least one supply chain entity economic value attributable to the product for the at least one supply chain entity, the at least one supply chain entity economic value selected from the group consisting of a revenue received amount, a wages paid amount, a taxes paid amount, and a charitable contribution amount.

10. The method according to claim 1, wherein determining an economic impact rating for the product includes determining an adjustment value, wherein the adjustment value relates the product price to a price of a comparable product.

11. The method according to claim 1, further comprising the system defining at least one additional perimeter of interest.

12. The method according to claim 11, further comprising: the system determining one or more economic impact value components,
wherein the one or more economic impact value components relates the product price to the brand entity economic value for each at least one additional perimeter of interest; and
the system determining an economic impact rating for the product for each at least one additional perimeter of interest.

13. The method according to claim 12, wherein the economic impact rating is based on the one or more economic impact value components for the geographic perimeter of interest and the one or more economic impact value components for the at least one additional perimeter of interest.

14. The method according to claim 4, further comprising:
the system determining a comparable product based on the industry classification of the product, wherein the industry classification comprises a general class of goods and at least one sub classification;
the system determining an additional economic impact rating for the comparable product; and
the network-enabled device communicating the additional economic impact rating for the comparable product to the user of the network-enabled device.

15. The method according to claim 1, wherein communicating the economic impact rating for the product includes communicating at least one additional economic impact rating for the product, wherein the at least one additional economic impact rating is for a region outside of the geographic perimeter of interest.

16. The method according to claim 15, wherein communicating the economic impact rating and communicating the at least one additional economic impact rating of the product includes displaying a map including the geographic perimeter of interest and the region outside of the geographic perimeter of interest with the respective economic impact ratings.

17. A system for rating a product, comprising:
a computing network comprising:
a central processing unit having a network interface;
a mass-storage device coupled to the central processing unit;
at least one database coupled to the central processing unit; and
a network-enabled device disposed in communication with the computing network via the network interface and configured for inputting a product identifier of a product;
communicating the product identifier to the central processing unit; and communicating an economic impact rating for the product to an user of the network-enabled device;
wherein the system is configured for
determining a product price of the product based on the product identifier; determining a brand entity of the product based on the product identifier;
determining one or more brand entity economic values attributed to the product for a geographic perimeter of interest, the one or more brand entity economic values selected from the group consisting of a revenue amount received by the brand entity, a wages amount paid by the brand entity, a taxes amount paid by the brand entity, and a charitable contribution amount made by the brand entity;
calculating an economic impact value component for each of the one or more brand entity economic values, wherein the economic impact value component relates the product price to the brand entity economic value for the geographic perimeter of interest; and determining an economic impact rating for the product based on the economic impact value component.

18. The system according to claim 17, further configured for:

determining a comparable product based on the product identifier;

determining an economic impact rating for the comparable product; and communicating the economic impact rating for the comparable product to the user of the network-enabled device.

19. The system according to claim 17, wherein communicating the economic impact rating for the product includes communicating at least one additional economic impact rating for the product, wherein the at least one additional economic impact rating is for a region outside of the geographic perimeter of interest.

20. The system according to claim 17, further comprising defining the perimeter of interest based on user input received by the network-enabled device.

* * * * *